United States Patent [19]

Benoit

[11] 4,350,898

[45] Sep. 21, 1982

[54] LIGHTER THAN AIR WIND ENERGY CONVERSION SYSTEM UTILIZING AN EXTERNAL RADIAL DISK DIFFUSER

[76] Inventor: William R. Benoit, 11718 Whittier Rd., Mitchelville, Md. 20716

[21] Appl. No.: 200,105

[22] Filed: Oct. 24, 1980

[51] Int. Cl.³ .............................................. F03D 9/00
[52] U.S. Cl. ...................................... 290/55; 290/44; 244/33
[58] Field of Search ...................... 290/44, 55; 244/30, 244/33, 73, 153 R, 155 R; 415/2

[56] References Cited

U.S. PATENT DOCUMENTS

| | | | |
|---|---|---|---|
| 1,717,552 | 6/1929 | Dunn | 290/44 UX |
| 2,384,893 | 9/1945 | Crook | 244/73 |
| 2,433,344 | 12/1947 | Crosby | 244/33 |
| 2,485,543 | 10/1949 | Andreau | 290/55 X |
| 2,784,556 | 3/1957 | Perdue | 290/55 X |
| 4,073,516 | 2/1978 | Kling | 290/55 |
| 4,166,596 | 9/1979 | Houton, Jr. et al. | 290/55 X |
| 4,309,006 | 1/1982 | Biscomb | 290/55 X |

Primary Examiner—B. Dobeck
Assistant Examiner—W. E. Duncanson, Jr.
Attorney, Agent, or Firm—Nathan Edelberg; Robert P. Gibson; Saul Elbaum

[57] ABSTRACT

A lighter-than-air (LTA) wind energy conversion system (WECS) wherein the LTA envelope carries a main rotor and electrical generator to take advantage of high wind speeds available at high altitudes. The LTA envelope is tethered to a ground based mooring system designed to provide self-orientation for the LTA envelope. In a preferred embodiment, heavy mechanical transmissions are eliminated by providing a radial disk diffuser coupled to a main rotor which, upon rotation, drives an induction turbine positioned within a substantially linear duct which is, in turn, preferably located along the longitudinal axis of the LTA envelope. The output of the induction turbine is coupled to an electrical generator whose output is, in turn, transmitted to the ground via the tethering system. In an alternate embodiment, the main rotor may itself be ducted.

22 Claims, 8 Drawing Figures

LIGHTER THAN AIR WIND ENERGY CONVERSION SYSTEM UTILIZING AN EXTERNAL RADIAL DISK DIFFUSER

RIGHTS OF THE GOVERNMENT

The invention described herein may be manufactured, used, and licensed by or for the U.S. Government for governmental purposes without the payment to me of any royalty thereon.

BACKGROUND OF THE INVENTION

1. Field of the Invention

The present invention is related to wind energy conversion systems and, more particularly, is directed towards a wind energy conversion system which is carried aloft by a lighter-than-air structure.

2. Description of the Prior Art

The advent of fossil fuel shortages has stimulated the development of alternative energy sources, and in certain regions of the world wind energy conversion systems (WECS) are becoming more efficient and competitive in generating large amounts of electricity for residential or commercial use. Commercial versions of a WECS traditionally consist of a wind-driven rotor coupled to an electrical generator which are mounted on a tower to raise the large diameter rotor off the ground and as high in the wind regime as possible.

The major challenges to a designer of a WECS are the dilute concentration of energy in the wind as well as the intermittent nature of the wind. The low power density of wind dictates that WECS of large size are required if sizable amounts of electrical power are to be generated. The intermittent nature of the wind normally results in the rendering of a WECS in an idle state much of the time. This has resulted in granting wind-generated electricity a value equal only to the fossil or nuclear fuel displaced with relatively little value granted for the capital equipment. This has seriously retarded commercial WECS development.

In addition, since the wind spectrum contains gusts and lulls, the stresses introduced into the rotor system of a WECS are large, and require rotor designs and support structures which are, to say the least, quite a challenge to the designer.

Since the power contained in the wind is a function of the cube of the velocity, the siting of a WECS becomes extremely important. Thus far, the best sites for a ground-based WECS have been on the coastlines in the northern hemisphere, as well as on mountain tops and hill tops. The latter elevations replace the high towers required to position the wind-driven rotor high enough to benefit from the velocity gradient of the wind. Unfortunately, the availability of prime high-altitude sites is severely limited, and although the cost of tower construction is greatly reduced for such sites, the expenses of road building, transporting the heavy components and subsequent erection of the WECS are high.

It is generally considered that WECS must be placed beyond the boundary layer portion of the wind in order to become inexpensive in terms of the energy yields. Additionally, a WECS must be designed to afford maximum protection against violent storms, which in the past have been primarily responsible for wind machine breakdown or destruction.

In addition to the inherent high cost attendant to the construction of a tower of sufficient height to position a large diameter (e.g., 300 foot) rotor, ground-based towers suffer from several other deficiencies. One deficiency is that there is a requirement for an open approach to the tower location, which leads to the desirability of utilizing higher altitude, but relatively inaccessible, bald hills for placement of a WECS tower. Further, construction of a tower necessarily results in a fixed height for the main rotor whose electrical generating capability is therefore at the mercy of the wind density at that particular height at any given point in time. Further, undesirable vibrations have been observed which result from what is referred to as "tower shadow" which occurs when the blade of the rotor passes adjacent to the tower and sets up a type of vibratory forcing function effect. Additionally, there are inherent energy losses due to tower drag, and it is difficult to erect, service and maintain the equipment positioned on the top of the tower.

Due to gravity loads, there presently exists a practical maximum limit for the rotor diameter of approximately 300 feet. Further, a WECS having a 300 foot diameter rotor that produces 2.5 megawatts of electricity presently costs approximately $3 million and includes a massive transmission, drive shaft and heavy bearings which add significantly to the cost of the WECS as well as complicate the tower design upon which such a massive system must be positioned. For example, a mechanical transmission required for a 300 foot diameter rotor would weigh approximately 150-200 tons.

In addition to the foregoing drawbacks, a conventional WECS requires yaw motors, bull rings and the like, to turn the main rotor as the wind shifts direction in order to maintain effective orientation. Such yaw motors and associated controls are expensive for large diameter rotors, are very slow to react, and add to maintenance and servicing problems.

There is a type of WECS which is known to obviate the need for a mechanical transmission. Such a WECS is known in the art as an Enfield-Andreau wind machine (see page 18 of "Wind Machines" by Frank R. Eldridge, The Mitre Corporation, October 1975). The Enfield-Andreau wind machine operates on a depression principle wherein the blades of the propeller are hollow and are provided with apertures at their tips. Generally, the interior of the blades communicate through an air passage in the hub of the propeller with the outlet of an air turbine which is coupled to an electric generator. When the wind velocity is of a value sufficient to cause rotation of the propeller, the air within the hollow blades is induced, by reason of the centrifugal force generated by its own mass, to flow out through the apertures in the blade tips thereby forming a depression (i.e., a pressure lower than that of the surrounding atmosphere) within the hollow blades. The air within the air turbine is then at a higher pressure than that of the air remaining within the blades, therefore establishing a continuous flow of air through the air turbine, the hub, the interiors of the blades and out through the apertures at the tips. The flow of air through the air turbine supplies power to drive the electric generator. A typical Enfield-Andreau WECS is set forth, for example, in U.S. Pat. No. 2,784,556 to Perdue. Such a ground-based system, however, still requires the propeller hub to be capable of rotation about a vertical axis in order that it may face into the wind. Additionally, a conventional Enfield-Andreau WECS requires the incoming air to make at least three 90° turns prior to expulsion through the propeller tips. Such a system inherently loses energy that it otherwise might have. Further, a ground-based Enfield-Andreau WECS suffers from the same deficiency set forth above with respect to other WECS, namely, the inability to take advantage of the high wind power densities found at considerable altitudes off the ground.

I am also aware of U.S. Pat. No. 4,073,516 which issued Feb. 14, 1978 to Kling. In this patent, the advantage of replacing a tower-based WECS with a gas-filled hollow body that carries a rotor assembly, current generator and alignment means is recognized. However, the apparatus disclosed in this patent for accomplishing these noteworthy objectives are complex. Initially, the system requires an alignment assembly for aligning the rotor to face into the wind, a ground anchor, and at least one captivating stay connecting the floating power plant to the anchor. The support body is connected to the captivating stay through a joint connection requiring three degrees of freedom. The rotors are gimbal-mounted at a variable relative position with respect to the support body but in fixed positions relative to one another. Additionally, the rotor assembly requires at least one pair of coaxially and coplanarly mounted counter-rotating rotors having their moments of momentum compensated. Again, while this patent does recognize the noteworthy advantage of elevating a wind-driven power plant into high-altitude winds by means of a lighter-than-air structure, the means for accomplishing same, it is felt, leaves much to be desired and may be impractical.

In my co-pending U.S. Patent Application, filed concurrently herewith and entitled "A LIGHTER THAN AIR WIND ENERGY CONVERSION SYSTEM", I set forth the combination of a lighter-than-air wind energy conversion system wherein the LTA envelope carries a main rotor and electrical generator to take advantage of high wind speeds available at high altitudes. The heavy mechanical transmissions of the prior art are eliminated by providing a hollow bladed main rotor which drives an induction turbine positioned within a substantially linear duct which is preferably located along the longitudinal axis of the LTA envelope. The apparatus set forth in said co-pending application takes advantage of and improves upon the depression turbine principles described above in connection with the Enfield-Andreau WECS.

There are, however, problems associated with depression turbines of the Enfield-Andreau type. The main problem is their low efficiency which results from the fact that hollow rotor blades are a poor pump due to jet damping, high velocities which cause pumping losses, and other losses resulting from the high velocity exit flow at the tips of the blades which is radial in direction. It would clearly be desirable if an alternate configuration could be advanced which allows separation of the air pump and the rotor system that would, in turn, allow individual optimization of the rotor system and air pump which communicates to the duct.

In addition to the foregoing, the hollow bladed rotor described in my co-pending application preferably utilizes untapered rotor blades due to reduced internal drag that would be high with tapered blades. However, approximately 40% more material is required to build an untapered blade of equal aerodynamic performance having the same diameter as a tapered blade, adding substantially to the cost and weight. Additionally, providing a twist to the blade, which is a costly manufacturing complexity for the hollow bladed rotor of my co-pending application, would be only one to two percent more efficient than an untwisted blade.

It is towards overcoming the above-noted deficiencies that the present invention is advanced.

I am also aware of the following U.S. patents which, together with the above-noted references, are considered by me to be the closest prior art to my invention: U.S. Pat. Nos. 1,717,552; 2,384,893; 2,433,344; and 3,936,652.

OBJECTS AND SUMMARY OF THE INVENTION

It is therefore a primary object of the present invention to provide a wind energy conversion system (WECS) which is more efficient and hence more economical than prior art systems which greatly reduces stresses impinging on the rotor and which is relatively easy to erect, maintain and service when compared to ground-based WECS.

An additional object of the present invention is to provide a wind energy conversion system which requires very little site prepartion, has little impact on the environment, is virtually pollution-free, noise-free and is visually unobjectionable.

A further important object of the present invention is to provide an airborne wind energy conversion system which eliminates the need for a mechanical transmission and thereby greatly reduces the weight of the system required to be airborne.

Another important object of the present invention is to provide a LTA-WECS which can produce, for example, the same amount of electricity with a rotor of one-fourth the size of a ground-based WECS, or can achieve four times the power as may be obtained for the same size rotor on a tower-based WECS.

A still further object of the present invention is to provide a lighter-than-air wind energy conversion system which eliminates inefficiencies associated with depression turbines and, more particularly, those associated with hollow rotor blades.

A still further object of the present invention is to provide an LTA-WECS which permits separation of the air pump and rotor system that allows individual optimization of the rotor system and creation of a vacuum to communicate to the main duct.

An additional object of the present invention is to provide a wind energy conversion system which incorporates an air pump that permits optimization of rotor blade design both aerodynamically and weightwise to reduce the cost of the rotor and the weight thereof which weight reductions cascade through the entire LTA vehicle.

The foregoing and other objects are attained in accordance with one aspect of the present invention through the provision of apparatus which comprises a lighter-than-air structure and means supported by the lighter-than-air structure for generating electricity. Such means includes a main rotor adapted to be rotated by the wind, a diffuser coupled to rotate with the main rotor, a turbine in fluid communication with the diffuser, and an electrical generator coupled to the turbine. Means are preferably connected between the lighter-than-air structure and the ground for tethering the structure and for delivering electricity from the generator.

In accordance with more specific aspects of the present invention, the diffuser includes an air inlet, an air outlet, and a plurality of vanes, one end of each of the vanes positioned adjacent the air inlet while the other end of each vane is positioned adjacent the air outlet. The diffuser preferably further comprises a pair of substantially planar, disk-shaped cover plates between which the vanes are mounted, the air inlet positioned in the center of one of the plates while the air outlet is positioned on the periphery between the two plates. The vanes are preferably curved and extend radially outwardly from the air inlet to the air outlet. The main rotor preferably comprises a pair of rotor blades connected by a spar, the diffuser having a diameter substantially equal to the length of the spar and being mounted thereto so as to rotate therewith.

The system further includes duct means for coupling the air inlet of the diffuser to the turbine, the latter preferably being positioned within the duct means. More particularly, the duct means includes an open front end and a rear end, the air inlet of the diffuser coupled to the rear end while the diffuser is adapted, upon rotation, to draw air through the open front end of the duct means. The turbine preferably includes impeller blade means adapted to be rotated by the air drawn through the open front end of the duct means. The electrical generator may be positioned either forwardly or rearwardly of the turbine.

The duct means preferably comprises a substantially linear duct from the front end to the rear end thereof to minimize air losses. In one embodiment, the duct is positioned within the lighter-than-air structure substantially along the longitudinal axis thereof. In this embodiment, the open front end of the duct comprises a ram air inlet.

In a preferred embodiment, the main rotor is connected to the rear of the lighter than air structure and rotates in a plane which is substantially perpendicular to the longitudinal axis of the structure.

In accordance with other aspects of the present invention, the means connected between the lighter-than-air structure and the ground preferably comprises at least one tethering cable means and at least one electrical cable means. Preferably provided on the ground are means for mooring the cable means which includes means for selectively drawing in the cable means and thereby bringing the structure closer to the ground. More particularly, the cable means may include at least two cables one of which is connected to the fore portion of the structure, the mooring means including a beam which is pivotally coupled to a support pedestal and includes a cable connected preferably through a winch to each end thereof. In the LTA-WECS, the cables are connected to a pair of fore and aft outriggers that extend laterally from the lighter-than-air structure.

In accordance with yet another aspect of the present invention, a major duct means may be connected to and extend rearwardly from the lighter-than-air envelope for augmenting the air flow through the main rotor. The major duct means circumferentially encloses the main rotor and includes a large air input opening which flares out through the body of the major duct means to an increased diameter air output exhaust.

BRIEF DESCRIPTION OF THE DRAWINGS

The foregoing and other objects, aspects, uses and advantages of the present invention will become more fully appreciated as the same becomes better understood from the following detailed description of the present invention when considered in connection with the accompanying drawings, in which.

DETAILED DESCRIPTION OF THE PREFERRED EMBODIMENTS

Figure 1:
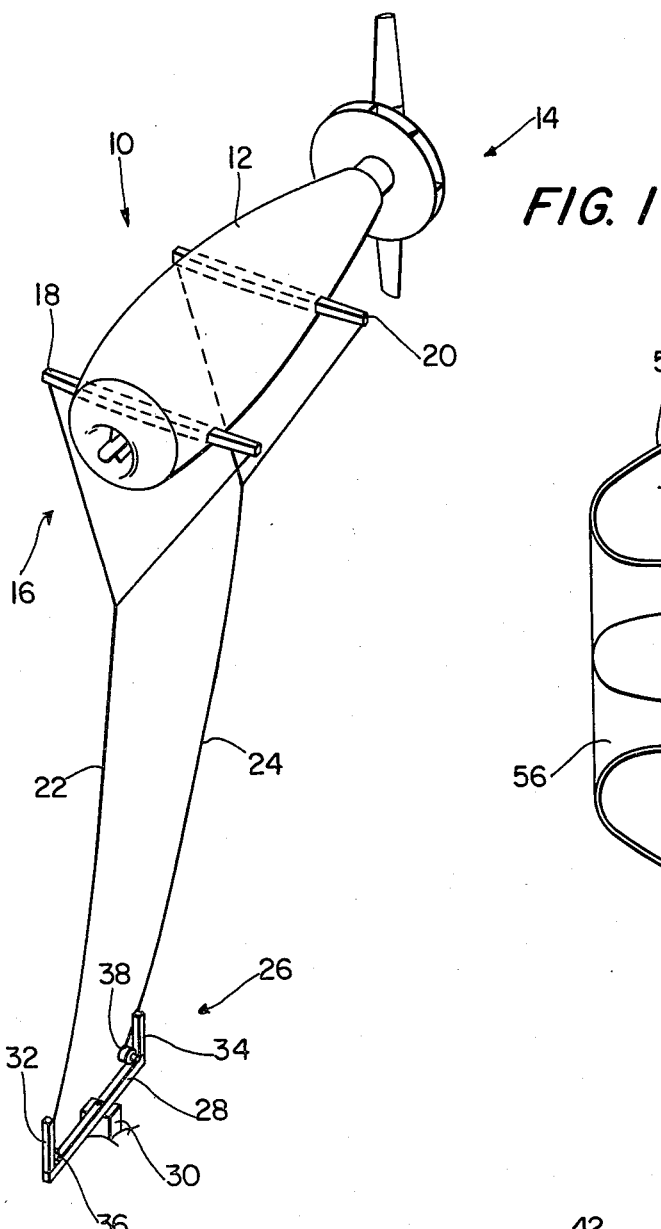
FIG. 1 is a perspective view of a preferred embodiment of the present invention.

Referring now to the drawings, wherein like reference numerals represent identical or corresponding parts throughout the several views, and more particularly to FIG. 1 thereof, reference numeral 10 indicates generally a preferred embodiment of a lighter-than-air wind energy conversion system (LTA-WECS) of the present invention.

The LTA-WECS 10 includes a lighter-than-air envelope 12 which may be made of a rigid construction or of a flexible material such as an elastomerized fabric of suitable properties on a rigid structure. A flexible construction reduces stresses, but may exhibit slightly higher drag than a rigid construction. Shown mounted on the rear portion of the envelope 12 is a wind-driven main rotor assembly 14, the details of construction of which will be described hereinafter. The main rotor assembly 14 need not necessarily be mounted at the rear of envelope 12, but may be positioned in any suitable location.

Shown positioned in the fore portion of envelope 12 is a generator structure which is indicated generally by reference numeral 16 which will be described in greater detail hereinafter.

Extending laterally from the body of envelope 12 are a pair of fore and aft outrigger assemblies 18 and 20. Connected to the ends of outriggers 18 and 20 are a pair of tethering cables 22 and 24, respectively. One of the tethering cables 22 and 24, or both, may include an electrical conductor for transmitting the energy output by electrical generator 16 to the ground. Of course, another function of cables 22 and 24 is to provide means for retaining the craft 10 at a desired altitude. Cables 22 and/or 24 may consist of a strong material, such as Kevlar ®, as an outer insulator for a center conductor, or separate tethering cables and electrical conductors may be provided, as may be desirable. Excess lift provided by the LTA envelope 12 will keep tethering cables 22 and 24 taut and the LTA envelope 12 in the desired wind regime. While a single tethering cable may work as well, the double tethering arrangement illustrated in FIG. 1 is preferred since it will maintain the LTA envelope 12 rigidly in a horizontal position as the system 10 translates downwind and upwind. Preferably, the LTA envelope 12 is designed with its center of lift co-located with its center of gravity, one of the tethering cables such as 24 being attached just below the center of gravity. The cable tethering system illustrated in FIG. 1 allows the structure 12 to translate in the downwind direction when impacted by a gust, thereby relieving the stresses on the system 10. When the gust expires and the lull begins, the restoring force from the lift vector of the envelope 12 will translate the vehicle into the wind thereby regaining the energy of the gust. This feature results in a smoothing of the velocity profile of the wind and, therefore, dramatically smooths the stresses or loads on the rotor 14.

The lower ends of the tethering cables 22 and 24 are secured to a mooring system which is indicated generally by reference numeral 26. Although the mooring system 26 could take any of a number of forms, in the preferred embodiment, the mooring system 26 includes an elongated beam 28 which is pivotally coupled at its center point to a support pedestal 30 (e.g., concrete) which is affixed in the ground. A pair of mooring stanchions 32 and 34 are provided at the ends of beam 28 to permit the LTA envelope 12 to be secured during bad weather. For this purpose, a pair of winches 36 and 38, or the like, may be provided for drawing in cables 22 and 24, respectively.

The pivoting beam 28 allows the system 10 to be self-orienting without experiencing the undesirable dynamic interaction between the prior art tower and rotor (referred to as "wind shadow"). Since the tethering system requires no tower, "tower shadow" is no problem. The preferred embodiment of the invention achieves aerodynamic damping by the envelope 12 in both pitch and yaw. Roll damping will be provided by the cable tethering system, and self-orientation eliminates the need for yaw motors, yaw dampers, yaw gear preload, ring gears, power to drive the yaw system, and associated inspection, repair and maintenance.

The stanchions 32 and 34 permit the airframe 12 to be rigidly connected to the beam 28 thereby permitting cable inspection, repair and replacement to occur very easily. The loads on the beam 28 when the LTA envelope 12 is drawn down will be substantially identical to the loads when the LTA envelope 12 is aloft.

Figure 2:
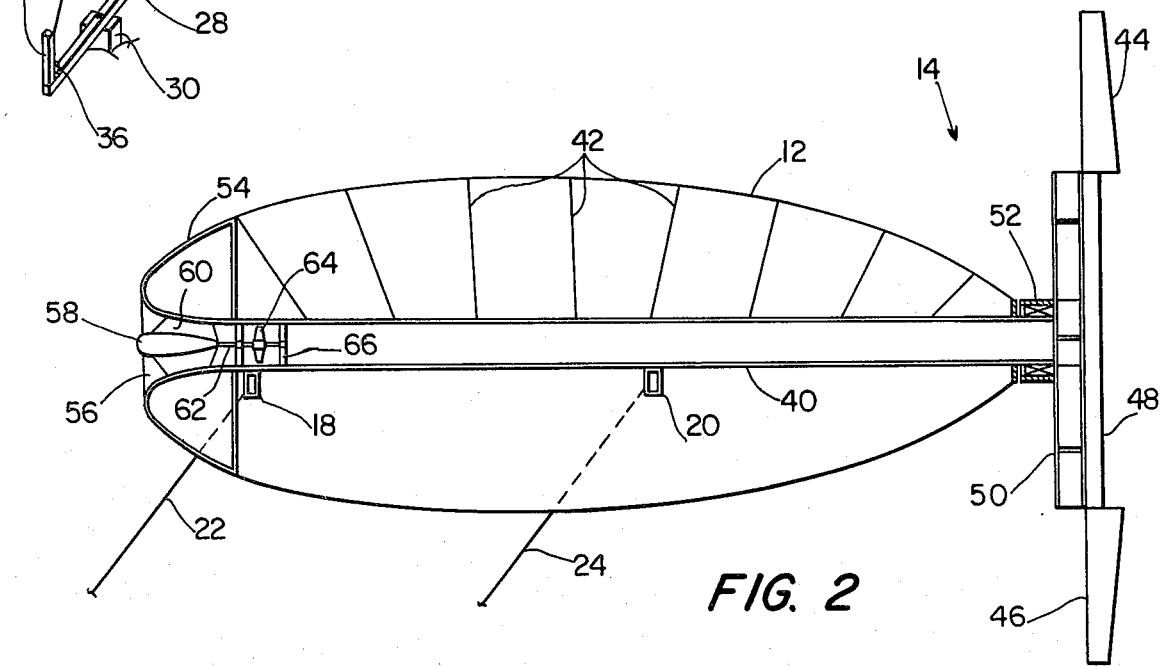
FIG. 2 is a longitudinal sectional view of the lighter-than-air structure of FIG. 1.

Referring now to FIG. 2, there is illustrated a longitudinal sectional view of the LTA envelope 12 of FIG. 1. Envelope 12 may be filled with helium, hydrogen or other suitable lighter-than-air gas.

Extending longitudinally along the center axis of LTA envelope 12 is a substantially linear hollow duct 40. Due to its preferred location along the neutral axis of LTA envelope 12, duct 40 may be constructed of lightweight tubing such as aircraft aluminum, glass reinforced plastic, or other fiber-reinforced plastic. The duct 40 may be supported, for example, by a plurality of internally secured suspension cables 42 or the like.

The main rotor assembly 14 includes conventional, tapered main rotor blades 44 and 46 which are connected by a box spar 48 or the like. Attached to the box spar 48 and adapted to rotate with main rotor blades 44 and 46 is a radial disk diffuser or ejector turbine 50, which will be described in greater detail hereinafter. Bearings 52 are provided for mounting the main rotor-diffuser assembly 14 about the rear open end of duct 40.

The generator structure 16 preferably comprises a substantially rigid, annular cowling 54 connected to the forward portion of the envelope 12. Cowling 54 forms an air inlet opening 56 which comprises a ram air inlet to duct 40. The ram air inlet 56 helps to minimize shear shock to the rotor 14 during sudden wind gusts. That is, the air flow into and out of the system, to be described in greater detail hereinafter, is smoothed, thereby smoothing the loads on the rotor 14. The convergent inlet 56 integral with the nose fairing or cowling 54 increases the velocity of the ram air to an extraction turbine 64, which results in an increase in the pressure differential across the turbine 64 thereby increasing its rotational speed which results in a generator of smaller weight, size and cost.

An electric generator 58 may be mounted in this embodiment forwardly of the extraction turbine 64 and may be held in place by support struts 60 connected to the cowling 54. The extraction turbine includes impeller blades 64 which rotate a drive shaft 62 connected to the generator 58. The extraction turbine 64 is preferably a substantially conventional vaneaxial turbine 64 having diffuser guide vanes 66 associated therewith.

Proper aerodynamic design of the inlet duct 56 to the extraction turbine 64 provides ram air, as stated above, to the inlet face which increases the pressure differential across the turbine. The location of the extraction turbine 64 in the duct 40 provides protection to the turbine 64 by screening of the inlet 56, provides ease in reducing turbine tip looses, and allows the incorporation of stators which will increase efficiency. Alternatively, the entry to the extraction turbine 64 may be provided as a pitot system, which is well-known in the art.

Figure 3:
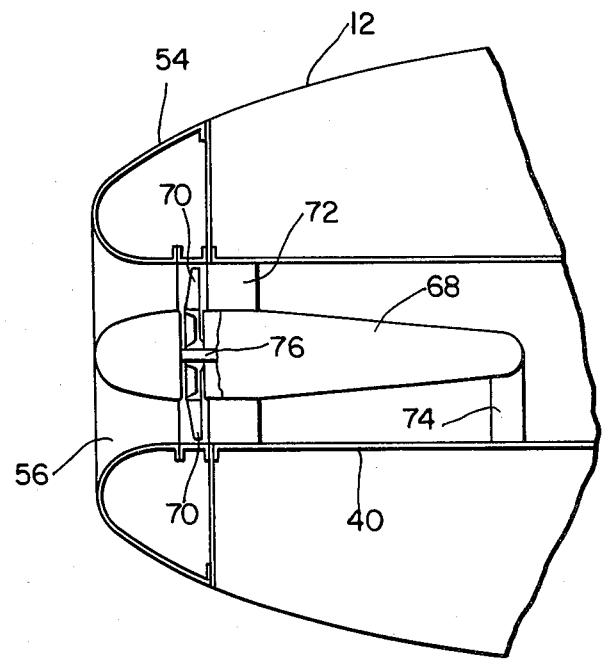
FIG. 3 is an enlarged, broken sectional view of the forward portion of an alternate embodiment to that illustrated in FIG. 2.

Referring now to FIG. 3, there is illustrated an alternate vaneaxial turbine and generator design for the front end of envelope 12. In this embodiment, generator 68 is positioned rearwardly of vaneaxial turbine 70. Diffuser guide vanes 72 are provided, along with a support strut 74. A shaft 76 couples the impeller blades 70 of the turbine to the generator 68. Clearly, any suitable configuration of a turbine and generator within duct 40 may be utilized, as engineering considerations may dictate.

Figure 4:
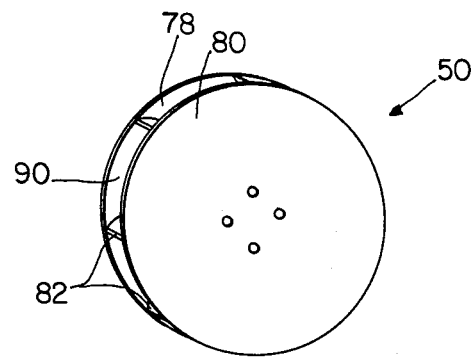
FIG. 4 is a perspective view illustrating a preferred embodiment of a radial disk diffuser.
Figure 6:
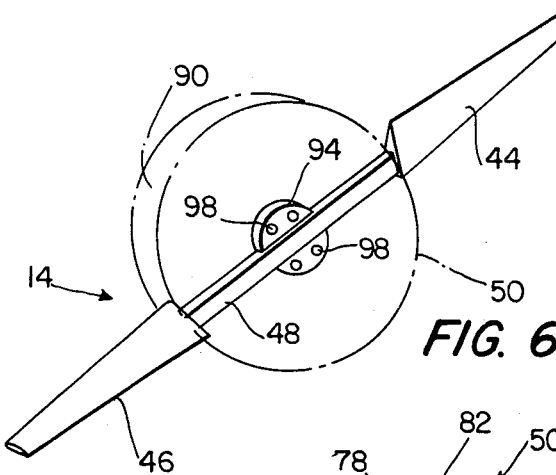
FIG. 6 is a perspective view of the main rotor blade structure shown coupled to the diffuser of the present invention.
Figure 5:
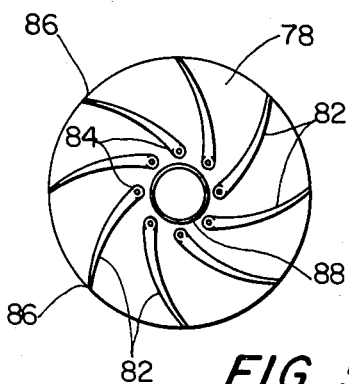
FIG. 5 is a vertical sectional view through the preferred embodiment of the radial disk diffuser of FIG. 4.

Referring now to FIGS. 4–6, the radial disk diffuser 50 of the main rotor assembly 14 is illustrated in greater detail. The diffuser 50 i seen to include a pair of substantially parallel, planar, disk-shaped end plates 78 and 80. Positioned between plates 78 and 80 are a plurality of curved vanes 82 which extend radially outwardly from their center point 84 to the external periphery 86 of diffuser 50. A hole or aperture 88 is provided in one of the plates 78 as an air inlet opening to maintain fluid communication with the rear end of duct 40. The air outlets 90 from diffuser 50 are distributed about the periphery of the diffuser defined by the space between the plates 78 and 80 and the vanes 82. Note that the vanes 82 are curved backwardly from their radial orientation to provide higher efficiency for the air pump.

In operation, freestream wind flowing around the LTA envelope 12 and the rotor blades 44 and 46 cause rotation of the rotor-diffuser system 14. Even though the rotor blades 44 and 46 may be relatively slow turning, the relatively large diameter of the diffuser 50 (e.g., aproximately half the diameter of the rotor) will provide an extremely efficient system, i.e., a high specific speed. In other words, the width and diameter of the diffuser 50 may be designed to attain a high specific speed, and hence a high pumping force for drawing induced air through the inlet 56 of the hollow duct 40. This flow passes through the axial flow extraction turbine 64 which, in turn, rotates the generator shaft 62. In this manner, the generator 58 rotates at a high rpm to generate electricity which is transmitted to the ground via cable/connectors 22 and/or 24.

The radial disk diffuser 50 obviates the need for the hollow bladed rotor of a conventional Enfield-Andreau WECS and permits optimization of air pump and rotor design separately. Even though this particular design requires a spar 48 to be provided between rotor blades 44 and 46, this results in a substantial cost savings in the construction of the rotor blades. The diffuser disk fan 50 may be constructed of, for example, fiberglass to provide a lightweight, durable structure. Further, it may be appreciated that the elongated duct 40 and the diffuser 50 require only one 90° turn for the induced air, greatly reducing losses associated with the prior art Enfield-Andreau WECS. In sum, the tapered rotor blades 44 and 46 in combination with the diffuser 50 permit a higher starting torque, easier starting, a higher efficiency, and is less expensive to construct. The heavy weight required by the prior art rotors is saved, which weight reduction cascades through the entire remainder of the LTA vehicle.

Figure 7:
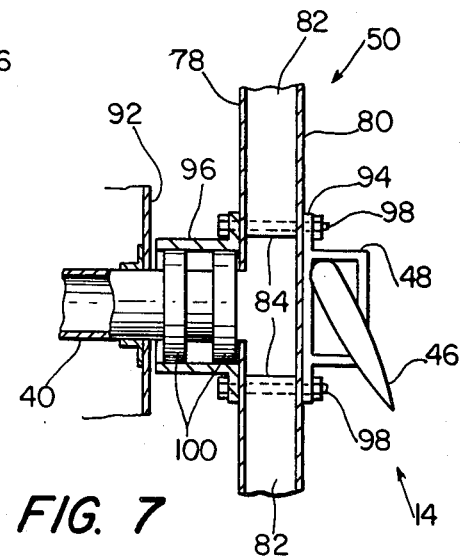
FIG. 7 is an enlarged, broken sectional view illustrating in greater detail the means for mounting the disk diffuser-rotor blade assembly of the present invention to the LTA structure.

Referring now to FIG. 7, there is illustrated a sectional view of one possible mounting system for the main rotor-diffuser assembly 14 of the present invention. Reference numeral 92 represents the aft bulkhead of the LTA envelope 12. A flange 94 is provided for mounting the box spar 48 and rotor blades 44 and 46 to the disk plate 80, while a cooperating flange 96 is provided to couple duct 40 and the aft bulkhead 92 to the plate 78. Mounting flanges 94 and 96 may be secured to diffuser 50 by bolt assemblies 98. Within mounting flange 96 may be provided thrust bearings 100.

Figure 8:
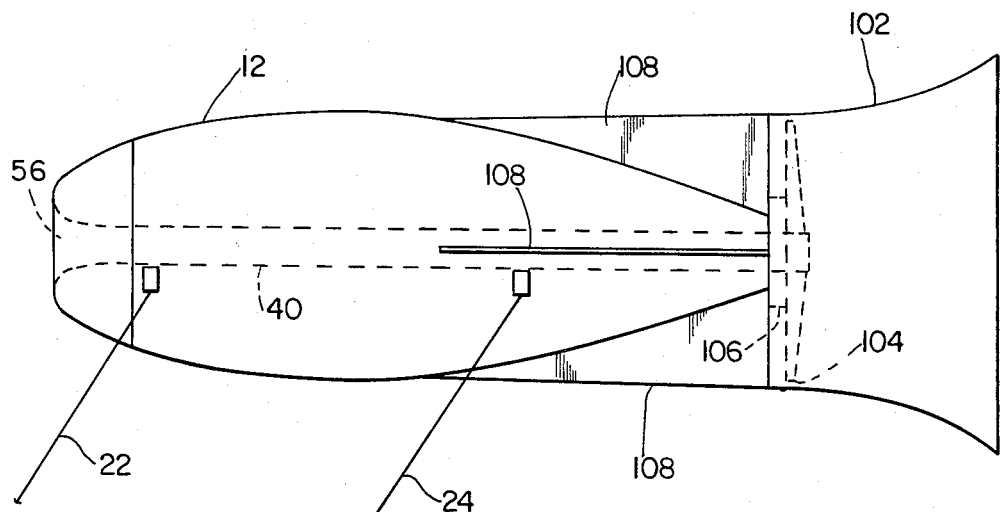
FIG. 8 is a side view of an alternate embodiment of the present invention.

Referring now to FIG. 8, there is illustrated an alternate embodiment of the present invention which utilizes the principle of flow augmentation through wind turbines by utilizing a major duct surrounding the main rotor. Reference numeral 102 indicates such a major duct which is seen to extend rearwardly from the LTA envelope 12 and peripherally surrounds the main rotor 104 and radial disk diffuser 106. The duct 102 includes a large opening in the fore portion thereof which flares out to an increased diameter air outlet at the rear portion thereof. A plurality of fins 108 may be spaced about the periphery of the rear portion of envelope 12 which also serve as supports for the major duct 102. The provision of duct 102 permits a reduction in the size and weight of rotor 104. Additionally, rotor 104 has a much higher rotational speed due to its smaller diameter, and results in an increased velocity to the turbine face, which will reduce the transmission requirements. The duct 102 may be constructed of a lightweight frame and flexible material. The smaller rotor system 104–106 saves weight, and the elimination of a heavy transmission by use of the radial diffuser (not illustrated) makes smaller devices practical. It may be appreciated that the overall outline of the structure of FIG. 8 is similar to a shuttlecock which has been shown to be aerodynamically stable. It should be appreciated that, although not preferred, in lieu of the diffuser 106, a mechanical transmission could be utilized with the major duct 102 and rotor 104.

Since the aerodynamic flow for the preferred embodiments replaces the standard mechanical transmission, the weight of the transmission is eliminated. Since the weight of a transmission typically exceeds that of the rotor, hub and associated controls, the present invention represents a substantial weight savings. The size of the duct 40 is preferably small to permit use of a very high speed vaneaxial turbine and associated generator. The high speed generator 58 is rather light when compared to standard generators used for wind turbines. The location and weight of the turbine, generator and duct system at the nose of the envelope 12 offsets the weight of the main rotor and diffuser system in terms of the center of gravity of the device 10. The vaneaxial turbine 64 is preferably directly coupled to generator 58 via shaft 62, without requiring step-up gearing, the generator being operated at a synchronous speed with the rest of the power grid.

The mooring station 26 of the present invention may be located conveniently to the interface to the electrical power grid as long as the winds aloft are of sufficient average strength. Locations of the present invention in a valley, for example, are extremely attractive since same will provide maximum protection to the apparatus when it is retrieved in anticipation of a hurricane, for example. In a worst case storm, the envelope may be deflated. Dramatic savings may be realized with the present invention for off-shore sites that enjoy the most favorable wind regimes. WECS located off-shore may be tethered to anchors, for example, which would be much cheaper than floor-based tower structures. Additionally, off-shore WECS may be towed to their sites and can generate power during the process of towing. Assembly and check out may be accomplished at a shore station prior to towing. Additionally, maintenance, repair and modification may be done at the shore base. Clearly, the design of the present invention will not require structure to oppose the fury of sea waves during storms.

Environmentally, it is by now appreciated that windmills are non-polluting devices that, if efficient, can greatly reduce the energy supply problem. Although the present invention is quiet compared to other mechanical equipment, the device may be placed high enough so that it would be soundless to personnel on the ground. Aesthetically, the invention is a dramatic improvement over conventional ground-based machines. The high altitudes and thin cables render a degree of near invisibility for personnel at the mooring site, and a reduction in apparent size for distant observers.

It may be appreciated that the present invention provides many solutions to the disadvantages and deficiencies of the prior art WECS. Since the surface-to-volume ratio of gas envelopes becomes more favorable with increased size, and because wind rotors become cheaper per square foot of swept area with increased size, an economical WECS according to the present invention will be quite large. For example, it is estimated that machines having 200 foot rotor diameters are feasible. Much larger sizes, capable of generating 10 megawatts, may also be achieved. Further, with the ducted configuration of FIG. 8, a single 300 foot diameter rotor should produce the same power as 6 ground based 300 foot diameter WECS.

Obviously, numerous modifications and variations of the present invention are possible in light of the above teachings. It is therefore to be understood that within the scope of the appended claims, the invention may be practiced otherwise than as specifically described herein.

I claim as my invention:
1. Apparatus, which comprises:
   a lighter than air structure;
   means supported by said lighter than air structure for generating electricity, said means including a main rotor adapted to be rotated by the wind, a diffuser coupled to rotate with said main rotor, a turbine in fluid communication with said diffuser, and an electrical generator coupled to said turbine; and means connected between said lighter than air structure and the ground for tethering said structure and for delivering electricity from said generator.

2. The apparatus as set forth in claim 1, wherein said diffuser includes an air inlet and an air outlet.

3. The apparatus as set forth in claim 2, wherein said diffuser comprises a plurality of vanes, one end of each of said vanes positioned adjacent said air inlet, the other end of each of said vanes positioned adjacent said air outlet.

4. The apparatus as set forth in claim 3, wherein said diffuser further comprises a pair of substantially planar disk-shaped cover plates between which said vanes are mounted, said air inlet positioned in the center of one of said plates, said air outlet on the periphery thereof.

5. The apparatus as set forth in claim 4, wherein said vanes are curved and extend radially outwardly from said air inlet to said air outlet.

6. The apparatus as set forth in claim 5, wherein said main rotor comprises a pair of rotor blades connected by a spar, said diffuser having a diameter substantially equal to the length of said spar and being mounted thereto so as to rotate therewith.

7. The apparatus as set forth in claim 2, further comprising duct means for coupling said air inlet of said diffuser to said turbine.

8. The apparatus as set forth in claim 7, wherein said turbine is positioned within said duct means.

9. The apparatus as set forth in claim 8, wherein said duct means includes an open front end and a rear end, said air inlet of said diffuser coupled to said rear end, said diffuser adapted, upon rotation thereof, to draw air through said open front end.

10. The apparatus as set forth in claim 9, wherein said turbine includes impeller blade means adapted to be rotated by the air drawn through said open front end of said duct means.

11. The apparatus as set forth in claim 10, wherein said electrical generator is positioned forwardly of said turbine.

12. The apparatus as set forth in claim 10, wherein said electrical generator is positioned rearwardly of said turbine within said duct means.

13. The apparatus as set forth in claim 10, wherein said duct means comprises a substantially linear duct from said front end to said rear end thereof.

14. The apparatus as set forth in claims 7, 9 or 13, wherein said duct means is positioned within said lighter than air structure substantially along the longitudinal axis of said structure.

15. The apparatus as set forth in claim 14, wherein said open front end of said duct means comprises a ram air inlet.

16. The apparatus as set forth in claims 1, 6 or 13, wherein said main rotor is connected to the rear of said lighter than air structure and rotates in a plane which is substantially perpendicular to the longitudinal axis of said structure.

17. The apparatus as set forth in claim 1, wherein said means connected between said lighter than air structure and the ground comprises at least one tethering cable means and at least one electrical cable means.

18. The apparatus as set forth in claim 17, further comprising means positioned on the ground for mooring said cable means which includes means for selectively drawing in said cable means and thereby bringing said structure closer to the ground.

19. The apparatus as set forth in claim 18, wherein said cable means includes at least two cables, one of which is connected to the fore portion of said structure, said mooring means including a beam pivotally coupled to a support pedestal and having one of said cables connected to each end thereof.

20. The apparatus as set forth in claim 19, further comprising outriggers extending laterally from said lighter than air structure to which said cables are connected.

21. The apparatus as set forth in claims 1, 6 or 9, further comprising major duct means connected to and extending rearwardly from said lighter than air envelope for augmenting the air flow through said main rotor.

22. The apparatus as set forth in claim 21, wherein said major duct means circumferentially encloses said main rotor and includes an air input opening and an increased diameter air output exhaust.

* * * * *